(12) United States Patent
Fiedler

(10) Patent No.: US 10,610,811 B2
(45) Date of Patent: Apr. 7, 2020

(54) FILTER DEVICE WITH FILTER ELEMENT

(71) Applicant: HYDAC FILTERTECHNIK GMBH, Sulzbach/Saar (DE)

(72) Inventor: Sebastian Fiedler, Spiesen-Elversberg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 75 days.

(21) Appl. No.: 15/736,830

(22) PCT Filed: Jun. 14, 2016

(86) PCT No.: PCT/EP2016/000982
§ 371 (c)(1),
(2) Date: Dec. 15, 2017

(87) PCT Pub. No.: WO2017/025160
PCT Pub. Date: Feb. 16, 2017

(65) Prior Publication Data
US 2018/0361279 A1 Dec. 20, 2018

(30) Foreign Application Priority Data

Aug. 12, 2015 (DE) .......................... 10 2015 010 533

(51) Int. Cl.
| B01D 29/92 | (2006.01) |
| B01D 29/21 | (2006.01) |
| B01D 35/31 | (2006.01) |

(52) U.S. Cl.
CPC ........... B01D 29/925 (2013.01); B01D 29/21 (2013.01); B01D 35/31 (2013.01); *B01D 2201/291* (2013.01); *B01D 2201/403* (2013.01)

(58) Field of Classification Search
CPC .... B01D 29/902; B01D 29/925; B01D 35/31; B01D 27/108; B01D 2201/291; B01D 2201/403
See application file for complete search history.

(56) References Cited

U.S. PATENT DOCUMENTS

2012/0132582 A1* 5/2012 Gluck .................... B01D 35/31
 210/350
2012/0312733 A1* 12/2012 Elayed .................. B01D 29/21
 210/483

FOREIGN PATENT DOCUMENTS

| DE | 10 2010 027 069 | 2/2012 |
| DE | 10 2012 020 431 | 4/2014 |
| EP | 2 489 845 | 8/2012 |
| JP | 60-195916 | 12/1985 |

(Continued)

OTHER PUBLICATIONS

International Search Report dated Sep. 1, 2016 in International PCT Application No. PCT/EP2016/000982.

*Primary Examiner* — Benjamin M Kurtz
(74) *Attorney, Agent, or Firm* — Wenderoth, Lind & Ponack, L.L.P.

(57) ABSTRACT

A filter device for filtering fluid particularly an aqueous urea solution, includes a filter housing (1), a filter element (11) and a compensating element (31) for compensating fluctuations in the pressure and/or volume of the fluid. At least one elastically-flexible membrane (31) serves as the compensating element. The membrane wall of of the membrane is held in a retaining part (35) and maintains a separation between the fluid and a compressible filling medium such as a working gas.

19 Claims, 1 Drawing Sheet

(56) References Cited

FOREIGN PATENT DOCUMENTS

| WO | 2011/060254 | 5/2011 |
|----|-------------|--------|
| WO | 2013/053482 | 4/2013 |
| WO | 2015/086440 | 6/2015 |

* cited by examiner

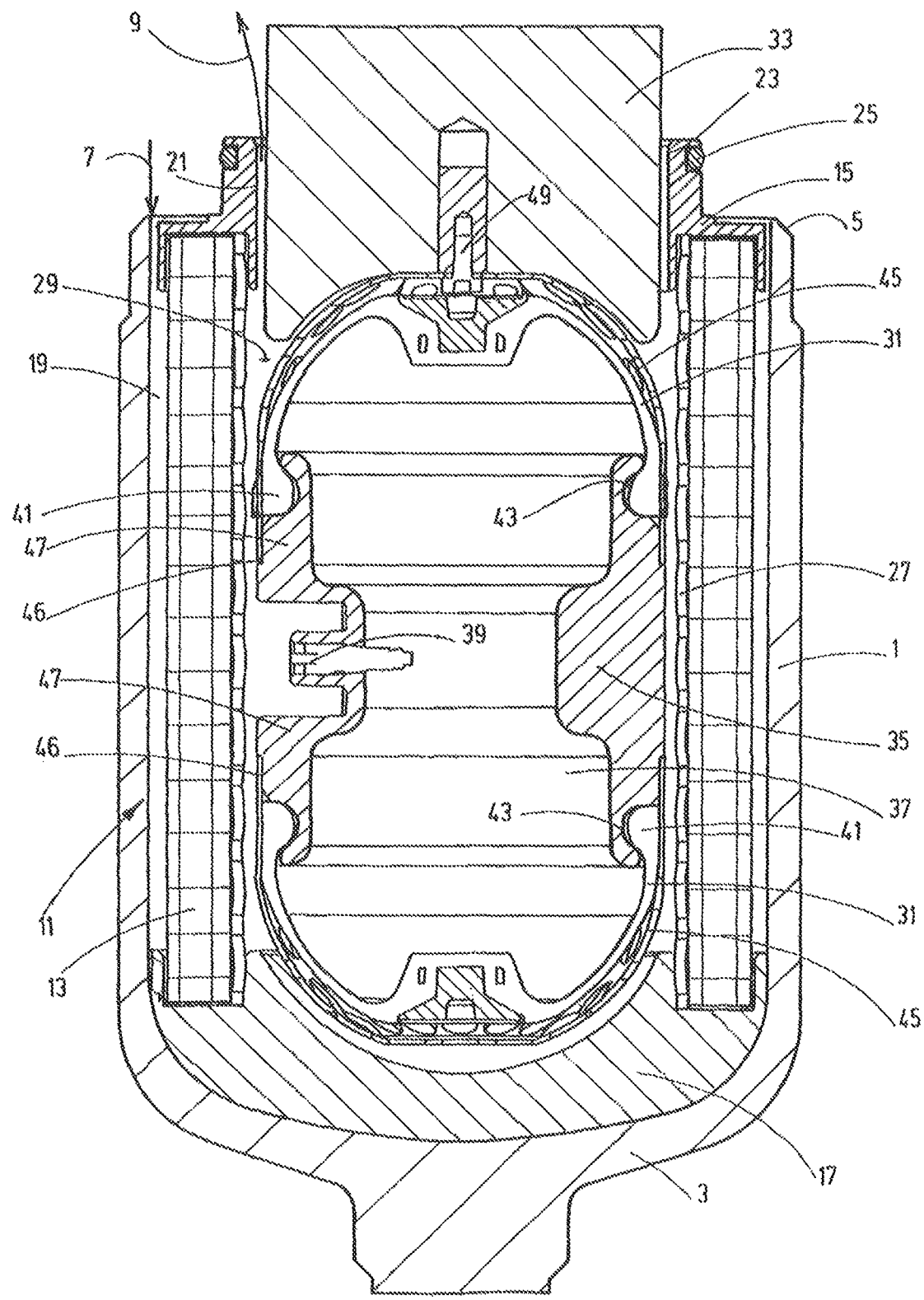

FILTER DEVICE WITH FILTER ELEMENT

FIELD OF THE INVENTION

The invention relates to a filter device for filtering fluid, particularly in the form of an aqueous urea solution, comprising a filter housing and a filter element arranged therein, as well as a compensating element for compensating fluctuations in the pressure and/or volume of the fluid. The invention further relates to a filter element which, in particular designed as an interchangeable element, can preferably be used for such a filter device.

BACKGROUND OF THE INVENTION

DE 10 2012 020 431 A1 discloses a filter device comprising at least one filter element, through which a fluid to be purified can flow with a determinable fluid operating pressure and which can be accommodated in a housing. The fluid pressure prevailing at the respective filter element may exhibit general pressure increases or pressure peaks damaging to the respective filter element, in particular to the filter material thereof. The pressure increases or peaks can be reduced and/or smoothened by a compensation device that acts directly upon the respective filter element and that has at least one flexible compensation element that enables the volume of the fluid chamber of the housing to be increased in accordance with a pressure peak or pressure increase. In the prior art solution, the flexible compensating element is arranged upstream between the outside of the filter material of the filter element and the adjacent inner wall of the housing, i.e. the fluid passage between the compensating element and the filter element is connected to the fluid inlet and the fluid supply is thus arranged upstream. The fluid filtered by the filter element is discharged from the filter device downstream via a centrally arranged opening in the end cap.

In the prior art solution, the flexible compensating element is configured in the nature of a bowl inserted in the housing of the filter device and is preferably made of a cellular rubber material. The prior art solution can also be used to compensate for the increase in volume of a freezing aqueous urea solution (as used in SCR exhaust systems, particularly in automotive engineering) via the cellular rubber compensating element in order to help prevent damaging pressure influences exerted on the sensitive filter element material by the increase in volume.

The volume increase could lead to the inoperability of the filter device, in particular if the freezing of the fluid material results in a tear or the like in the filter element material. Because of the relatively rigid material properties of the cellular rubber used for the compensating element, the compensating mechanism of the prior art filter device, acting as a pulsation damper, is suitable for smoothing out or attenuating sudden pressure spikes, but is hardly suitable for compensating the increase in volume that occurs in the filtering of aqueous urea solutions in the event of freezing.

SUMMARY OF THE INVENTION

The present invention addresses the problem of providing an improved filter device of the aforementioned type in which the compensating element provides particularly effective and reliable freeze protection during operation using freezable fluids such as an aqueous urea solution.

According to the invention, this object is basically achieved by a filter device that has, as an essential feature of the invention, a compensating element made of at least one elastically flexible diaphragm. The diaphragm wall of the compensating element is held in a retaining part, maintaining a separation between the fluid and a compressible filling medium such as a process gas. In a particularly advantageous manner, a compensating mechanism in the form of a diaphragm accumulator is achieved in that way, which when the filling pressure of the filling medium (such as the process gas) is adjusted to the pressure of the operating fluid, enables the necessary increase in volume in the event of freezing, but without a more powerful pressure surge that would damage the filter element.

Because the compensating element in the prior art solution, as explained, is arranged upstream inside the housing of the filter device, i.e., on the unfiltrate side, it takes up a relatively large amount of construction space in the filter housing. In an advantageous fashion, the arrangement in the filter device according to the invention can be made such that the diaphragm is arranged on the downstream filtrate side of the filter element. By virtue of the entire compensating mechanism (i.e., the diaphragm plus the compressible filling medium, such as process gas) being shifted into the housing interior surrounded by the filter medium, the compensating mechanism does not contribute to enlarging the outer periphery of the filter housing surrounding the outside of the filter medium.

With particular advantage, the diaphragm can be configured cup-shaped, spherical shell-shaped, or dome-shaped and be made of ethylene propylene diene monomer rubber (EPDM) or hydrogenated acrylonitrile butadiene rubber (HNBR). These materials are especially well-suited for filter devices for aggressive fluids such as aqueous urea solutions. Nitrile butadiene rubber or other elastomers can obviously be used for other applications. A bulge, which engages in an assignable recess on the retaining part in a form-fitting manner, can be provided on the edge of the diaphragm for a particularly secure anchoring thereof.

With particular advantage, provision can be made of a cup-shaped diaphragm, which has similar design to a diaphragm used in diaphragm-type hydraulic accumulators. The possibility of using an identical component that is already available as a ready-made product for producing accumulators as a diaphragm permits the filter device according to the invention to be produced in a particularly cost-effective manner.

Exemplary embodiments, in which an at least partially fluid-permeable supporting body is arranged on the outer contour of the given diaphragm and essentially follows the outer contour thereof, are characterized by particularly high operational reliability over a long operating lifespan.

In particularly advantageous exemplary embodiments, the compensating element has two identically configured diaphragms that are fastened on opposite sides of the retaining part. The retaining part is configured as a hollow part and receives a process gas, preferably in the form of nitrogen gas, as a filling medium. The retaining part can advantageously have a filling mechanism for the compressible filling medium.

The compensating element can be surrounded at a predefinable radial distance by a cylindrical support tube having fluid passages. The outer periphery of the support tube supports the filter element. This support tube can form a component of the individual filter element.

This filter element can have two end caps between which the preferably pleated, multi-layer filter medium extends. At least one end cap at least partially fills in the filter housing, preferably at the bottom, in order to prevent dead volume and/or the other end cap is penetrated by a preferably temperature-controllable receiving block for securing the retaining part inside the filter housing. With particular advantage, such exemplary embodiments are suited for use in SCR exhaust systems because controlling the temperature of the receiving block, while the filter device is operating under freezing conditions, ensures that the aqueous urea solution remains in the liquid state by virtue of the retaining block being heated. In this way, the reliable operation of the SCR exhaust system is ensured, while the filter element is simultaneously protected from damage by the interchangeable element during downtimes under freezing conditions and in the event that the urea solution freezes.

The subject matter of the invention is also a filter element, in particular one designed as an interchangeable element, that is preferably provided for a filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view in section of a filter device according to an exemplary embodiment, of the invention, with the filter head removed from the bowl-shaped filter housing.

DETAILED DESCRIPTION OF THE INVENTION

The invention is described using the example of a filter device that can be used particularly advantageously in SCR exhaust systems for filtering aqueous urea solutions. The exemplary embodiment has a filter housing 1 in the form of a circular cylindrical bowl having a closed, dished head 3 and an open upper end 5. A housing lid or head that can be screwed onto the housing 1 on the upper end 5, which lid or head has been omitted in the FIGURE and has a fluid inlet and a fluid outlet for introducing the unfiltered fluid to be filtered into the housing 1 via an inlet area designated by a flow arrow 7 in the FIGURE, and for discharging filtered fluid from the housing 1 via an outlet area 9 designated by a flow arrow 9.

A filter element 11 is removably accommodated in filter housing 1, has a filter medium 13 forming a hollow cylinder that is preferably pleated and constructed of multiple layers in the manner typical of such filter devices and extends between an upper end cap 15 (at the top in the FIGURE) and a lower end cap 17. The filter element 11 is accommodated in the housing 1 such that the outside of the filter medium 13 is situated at a distance from the housing wall to form a space 19 surrounding the filter medium 13. Space 19 adjoins the fluid inlet area designated by the flow arrow 7 and forms the dirty side or the unfiltrate side in the filtering process. The lower end cap 17 has a closed, relatively large-volume shape. The outside of lower end cap 17 rests on the inner surface of the dished head 3 of the housing 1, when the filter element 11 is installed. The upper end cap 15 has the shape of an annular body surrounding a central opening 21. A connecting piece 23 projecting axially upward along the opening 21. On the outside of connecting piece 23, an O-ring 25 is situated, which forms the seal between the inflow area (flow arrow 7) and the outflow area (flow arrow 9) for a closed housing 1.

A support tube 27 having fluid outlets is located on the inside of the filter medium 13. The ends of the support tube 37, along with the ends of the filter medium 13, are accommodated in the end caps 15 and 17 forming a setting. The ends of the filter medium 13 and of the support tube 27 are secured in the end caps 15 and 17 by gluing, for example. A compensating mechanism, which has two diaphragms 31 as a compensating element, is arranged in the interior filter cavity 29 adjoining the inner surface of the support tube 27 that forms the downstream filtrate side. The volume of the interior filter cavity 29 is delimited at the lower surface facing the bottom 3 by the end cap 17, and at the upper end 5 of the filter housing 1 by a holding part 33, which also forms the mount for the compensating mechanism situated in the filter cavity 29. In order to keep the dead volume of the filter cavity 29 as small as possible, the lower end cap 17 is configured having a large volume and shaped such that it surrounds the outside of the diaphragm 31 facing it at a brief distance, and its lower outside rests on the entire area of the bottom 3 of the housing 1. For delimiting the dead volume of the cavity 29 at the upper end, the holding part 33 is shaped such that it also surrounds the upper outside of the upper diaphragm 31 at a brief distance.

As already mentioned, with its compensating element formed by diaphragms 31, the compensating mechanism forms a type of hydropneumatic diaphragm accumulator in which the diaphragms 31 are secured at opposite ends of a retaining part 35. Retaining part 35 is configured as a hollow body and, along with the diaphragms 31, delimits the space 37 containing the compressible filling medium. In the exemplary embodiment shown, a filler valve 39 for filling the space 37 using nitrogen gas. Obviously, a different kind of filling mechanism can be provided if a different kind of filling medium is used, for example a non-gaseous one, such as a foam material or the like. In a similar fashion and as is typical for diaphragm accumulators, the diaphragms 31 have a rim bulge 41 that is seated in a recess 43 formed on the given end edge of the retaining part 35. A supporting body 45 is provided for each diaphragm 31, which supporting body extends along the outside of the respective diaphragm 31 and has fluid outlets. In the example shown, a cup-shaped perforated plate is provided as a supporting body 45, the end edge 46 of each supporting body engages over the facing end region 47 of the retaining part 33 and is fastened, for example welded, thereon. Instead of a perforated plate, a net or lattice structure could also be provided as a supporting body 45. For securing the compensating mechanism, the supporting body 45 of the diaphragm 31 (at the top in the FIGURE) is bolted to the holding part 33 by a fastening screw 49 such that the entire compensating mechanism forms a component that can be removed through the opening 21 of the upper end cap 15, for example in order to fill the space 37 using process gas. The opening diameter of the opening 21 is slightly larger than the diameter of the holding part 33 and of the round retaining part 35, which have the same outer diameter. For an operation using aggressive fluids such as urea solutions, an elastomer that is compatible with these fluids such as ethylene propylene diene monomer rubber (EPDM) or hydrogenated acrylonitrile butadiene rubber (HNBR) can be provided as a material for the diaphragms 31. Ready-made diaphragms for diaphragm accumulators are available in these materials. Existing identical components the can be used in a cost-effective manner for the filter device according to the invention.

While one embodiment has been chosen to illustrate the invention, it will be understood by those skilled in the art that various changes and modifications can be made therein without departing from the scope of the invention as defined in the claims.

The invention claimed is:

1. A filter device for filtering fluid, the filter device comprising:
   a filter housing;
   a filter element in said filter housing;
   a compensating element in said filter housing capable of compensating for at least one of pressure or volume fluctuations of fluid in said filter housing, said compensating element having an elastically flexible first diaphragm with a diaphragm wall held in a retaining part and separating fluid in said filter housing outside of said compensating element from a compressible medium inside said compensating element;
   a partially fluid-permeable body being arranged on an outside of said first diaphragm and essentially following an outer contour of said first diaphragm; and
   a filler in said retaining part, said filler being capable of filling said compensating element with said compressible medium.

2. A filter device according to claim 1 wherein
   said first diaphragm is on a filtrate side downstream of said filter element.

3. A filter device according to claim 1 wherein
   said first diaphragm has at least one of a cup-shaped, spherical shell-shaped, or dome-shaped configuration and is made of at least one of ethylene diene monomer rubber or hydrogenated acrylonitrile butadiene rubber.

4. A filter device according to claim 1 wherein
   said first diaphragm comprises a rim with a bulge engaged in a recess in said retaining part.

5. A filter device according to claim 1 wherein
   said compensating element comprises an elastically flexible second diaphragm being identical to said first diaphragm and being secured on a side of said retaining part opposite to said first diaphragm;
   said retaining part is hollow and receives said compressible medium, said compressible medium being a gas as a filling medium.

6. A filter device according to claim 5 wherein
   said gas is nitrogen gas.

7. A filter device according to claim 1 wherein
   a cylindrical support tube surrounds said compensating element at a predefinable radial distance and has fluid passages therein, an outer periphery of said support tube supporting a filter medium of said filter element.

8. A filter device according to claim 1 wherein
   said filter element comprises first and second end caps and a pleated multi-layer filter medium extending between said first and second end caps, said first end cap at least partially filling said filter housing at a first end of said filter housing preventing formation of a dead volume at said first end, said second end cap being penetrated by a temperature-controllable holding block holding said compensating element inside said filter housing.

9. A filtering device for filtering fluids, the filtering device comprising:
   a filter housing;
   a filter element inside said filter housing;
   a compensating element in said filter housing capable of compensating for at least one of pressure or volume fluctuations of fluid in said filter housing, said compensating element having an elastically flexible and identical first and second diaphragms with diaphragm walls secured on opposite sides of a retaining part and separating fluid in said filter housing outside of said compensating element from a compressible gas inside said compensating element, said retaining part being hollow and receiving said compressible gas; and
   a filler in said retaining part, said filler being capable of filling said compensating element with said compressible medium.

10. A filling device according to claim 9 wherein
    partially fluid-permeable first and second bodies are arranged on outsides of said first and second diaphragms and follow outer contours of said first and second diaphragms, respectively.

11. A filter device according to claim 9 wherein
    said first and second diaphragms are on a filtrate side downstream of said filter element.

12. A filter device according to claim 9 wherein
    said first and second diaphragms have at least one of cup-shaped, spherical shell-shaped, or dome-shaped configurations and are made of at least one of ethylene diene monomer rubber or hydrogenated acrylonitrile butadiene rubber.

13. A filter device according to claim 12 wherein
    said first and second diaphragms comprise rims with bulges engaged in recesses in said retaining part.

14. A filter device according to claim 9 wherein
    said retaining part is hollow and receives said compressible gas.

15. A filter device according to claim 14 wherein
    said compressible gas is nitrogen gas.

16. A filter device according to claim 9 wherein
    a cylindrical support tube surrounds said compensating element at a predefinable radial distance and has fluid passages therein, an outer periphery of said support tube supporting a filter medium of said filter element.

17. A filter device according to claim 9 wherein
    said filter element comprises first and second end caps and a pleated multi-layer filter medium extending between said first and second end caps, said first end cap at least partially filling said filter housing at a first end of said filter housing preventing formation of a dead volume at said first end, said second end cap being penetrated by a temperature-controllable holding block holding said compensating element inside said filter housing.

18. A filter element for a filter device, the filter element comprising:
    a fluid pressure or volume compensating element having flexible first and second diaphragms having diaphragm walls held on opposite sides of a retaining part;
    a filler in said retaining part, said filler being capable of filling said first and second diaphragms with a compressible filling medium; and
    a filter medium enveloping said compensating element and extending between first and second end caps.

19. A filter element according to claim 18 wherein
    partially fluid-permeable first and second bodies are arranged on outsides of said first and second diaphragms and follow outer contours of said first and second diaphragms, respectively.

* * * * *